(12) United States Patent
Meyer et al.

(10) Patent No.: US 6,845,675 B2
(45) Date of Patent: Jan. 25, 2005

(54) MULTI-AXIS LOAD CELL

(75) Inventors: Richard A. Meyer, Chaska, MN (US); Douglas J. Olson, Plymouth, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 155 days.

(21) Appl. No.: 10/017,740

(22) Filed: Dec. 14, 2001

(65) Prior Publication Data

US 2002/0073786 A1 Jun. 20, 2002

Related U.S. Application Data

(60) Provisional application No. 60/255,947, filed on Dec. 15, 2000.

(51) Int. Cl.⁷ ............................. G01D 7/00; G01L 3/00
(52) U.S. Cl. ............................. 73/862.041; 73/862.046
(58) Field of Search ................... 73/862.046, 862.041, 73/862.043, 862.044, 862.042

(56) References Cited

U.S. PATENT DOCUMENTS

| 3,033,031 A | * | 5/1962 | Gruber ..................... 73/862.49 |
| 3,377,849 A | | 4/1968 | Lebow ........................ 73/134 |
| 3,618,376 A | | 11/1971 | Shull et al. .................. 73/133 |
| 3,693,425 A | | 9/1972 | Starita et al. ................ 73/133 |
| 3,771,359 A | | 11/1973 | Shoberg ................... 73/141 A |
| 3,780,573 A | | 12/1973 | Reus ......................... 73/146 |
| 3,867,838 A | | 2/1975 | Gerresheim ............... 73/133 R |
| 3,939,704 A | | 2/1976 | Zipin .................... 73/862.043 |
| 4,023,404 A | | 5/1977 | Brendel ..................... 73/133 R |
| 4,171,641 A | | 10/1979 | Landsness .................. 73/146 |
| 4,297,877 A | | 11/1981 | Stahl .......................... 73/146 |
| 4,448,083 A | | 5/1984 | Hayashi ................... 73/862.04 |
| 4,483,203 A | | 11/1984 | Capper .................... 73/862.04 |
| 4,488,441 A | | 12/1984 | Ramming ................. 73/862.04 |
| 4,493,220 A | | 1/1985 | Carignan et al. ......... 73/862.66 |
| 4,499,759 A | | 2/1985 | Hull ............................. 73/146 |
| 4,550,617 A | | 11/1985 | Fraignier et al. ......... 73/862.04 |
| 4,573,362 A | | 3/1986 | Amlani .................... 73/862.04 |
| 4,640,138 A | | 2/1987 | Meyer et al. ............. 73/862.04 |
| 4,672,855 A | | 6/1987 | Schmieder ............... 73/862.04 |
| 4,748,844 A | | 6/1988 | Yoshikawa et al. ........... 73/146 |

(List continued on next page.)

FOREIGN PATENT DOCUMENTS

| DE | 2 302 540 | 7/1974 |
| DE | 3313960 A1 | 10/1983 |
| EP | 0816817 A2 | 1/1998 |
| GB | 2 096 777 A | 10/1982 |

OTHER PUBLICATIONS

Wurll, "Tactile Force–Torque Sensor for Performing Control Tasks in Robotics", XP002210941, vol. 15, No. 3, pp. 120–125, 1986.

(List continued on next page.)

*Primary Examiner*—Edward Lefkowitz
*Assistant Examiner*—Lilybett Martir
(74) *Attorney, Agent, or Firm*—Westman, Champlin & Kelly P.A.; S. Koehler

(57) ABSTRACT

A load cell is provided that includes first and second sensor support assemblies. Each sensor support assembly has a rigid central hub having an end plate and a support element extending transversely from the end plate and also includes a rigid annular ring concentric with the central hub. A first mount is joined to the end plate of the first sensor support assembly, the mount being spaced apart from and extending in the same direction as the support element of the first sensor support assembly. A first plurality of sensing devices are operably coupled between the support element of the first and second sensing support assemblies and the corresponding annular rings, respectively. The end plates of the first and second sensor support assemblies are joined together.

22 Claims, 13 Drawing Sheets

U.S. PATENT DOCUMENTS

| | | | |
|---|---|---|---|
| 4,763,531 A | 8/1988 | Dietrich et al. | 73/862.04 |
| 4,821,582 A | 4/1989 | Meyer et al. | 73/862.04 |
| 4,823,618 A | 4/1989 | Ramming | 73/862.04 |
| 5,313,828 A | 5/1994 | Kotzle et al. | 73/146 |
| 5,315,882 A | 5/1994 | Meyer et al. | 73/862.044 |
| 5,400,661 A | 3/1995 | Cook et al. | 73/862.043 |
| 5,540,108 A | 7/1996 | Cook et al. | 73/862.041 |
| 5,894,094 A | 4/1999 | Kuchler et al. | 73/862.044 |
| 5,969,268 A * | 10/1999 | Sommerfeld et al. | 73/862.041 |
| 6,038,933 A | 3/2000 | Meyer | 73/862.045 |
| 6,324,919 B1 * | 12/2001 | Larsen et al. | 73/862.043 |

OTHER PUBLICATIONS

A. Rupp, W. Diefenbech, V. Grubisic, "Erfassung der mehraxialen Fahrbetriebsbelastungen mit dem MeBrad 'VELOS'", ATZ Automobiltechnische Zeitschrift 96, 1994, pp. 764–768.

A. Rupp, V. Grubisic, "Reliable and Efficient Measurement of Suspension Loads on Passenger Cars and Commercial Vehicles", reprint from "Advanced Measurements Techniques and Sensory Systems for Automotive Applications: Accuracy and Reliability", Proceedings of the 1st International Conference and Exhibition, Anoona 29–30.6. 1995, Hreg. ATA Orbassano (1995), S. 263–273.

C. Higashijima, S. Awasu, "Development of multiaxial wheel hub dynamometer", JSAE Review, vol. 16, No. 1, 1/95.

Brochure: Wheel force transducer—the key for real world simulation, Schenck ATC, 4/95.

"Flexible Wheel Force Transducer System for Road Load Data Acquisition", IGEB, 4/95.

TML pam E–670 A: "TML 6–Component Wheel Force Measuring Equipment SLW–A/MPT–106", Texas Measurements, Inc.

"Unique Solutions to Measurement Problems", Robert A. Denton, Inc.

"MMS–6800", Nissho Electric Works, Col. Ltd.

Walter Weiblen, Thomas Hofman, "Evaluation of Different Designs of Wheel Force Transducers", SAE Technical Paper Series, International Congress and Exposition, Feb. 23–26, 1998, pp. 1–10.

Milton J. Lebow, "Summer Instrument–Automation Conference and Exhibit—Toronto, Ontario, Canada", Instrument Society of America Conference Preprint, Jun. 5–8, 1961.

G. Hirsinger, "Direct Digital Robot Control Using A Force–Torque–Sensor", IPAC Symposium on Real Time Digital Control Applications, Guadalajara, Mexico, Jan. 15–21, 1983.

Assorted Astek Engineering, Inc. brochures, 1983.

* cited by examiner

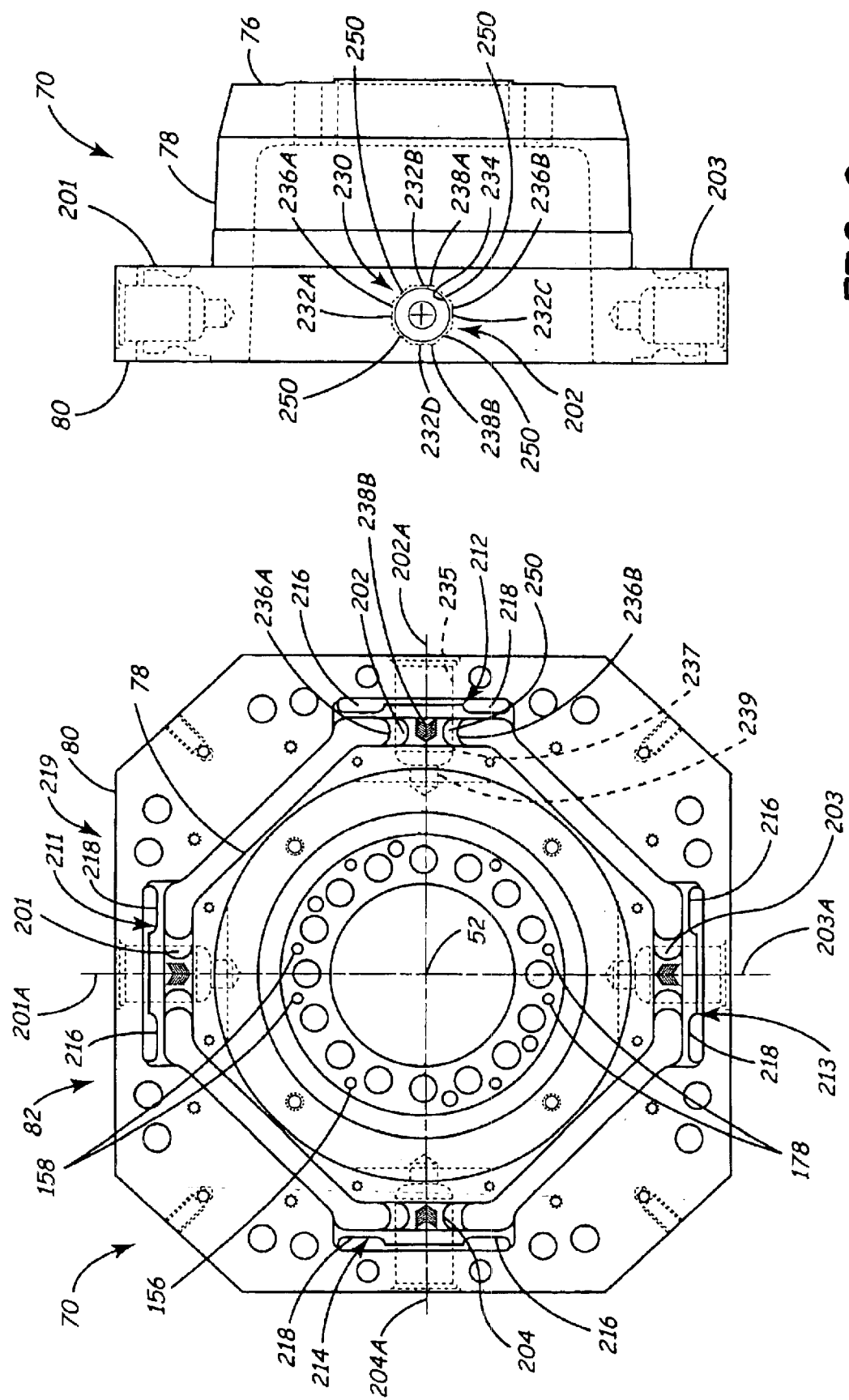

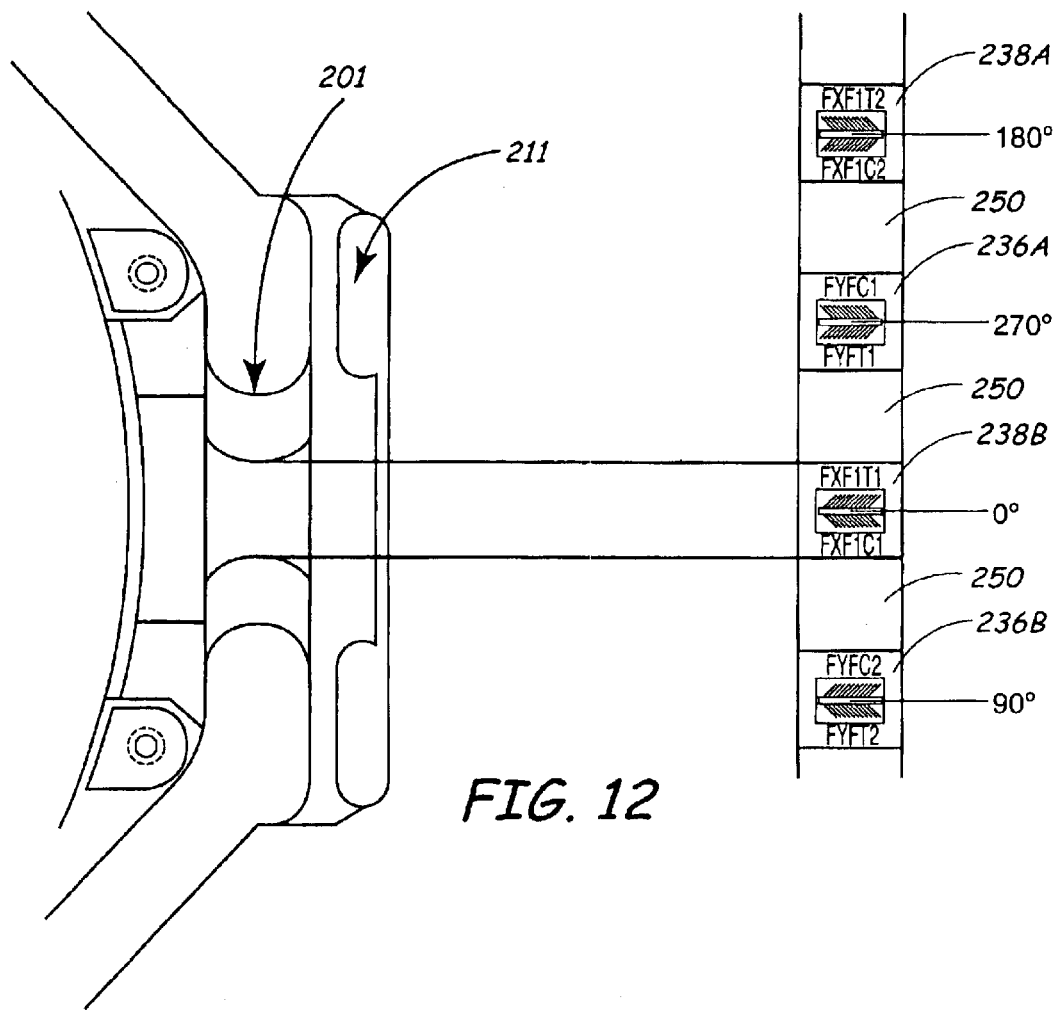
FIG. 12
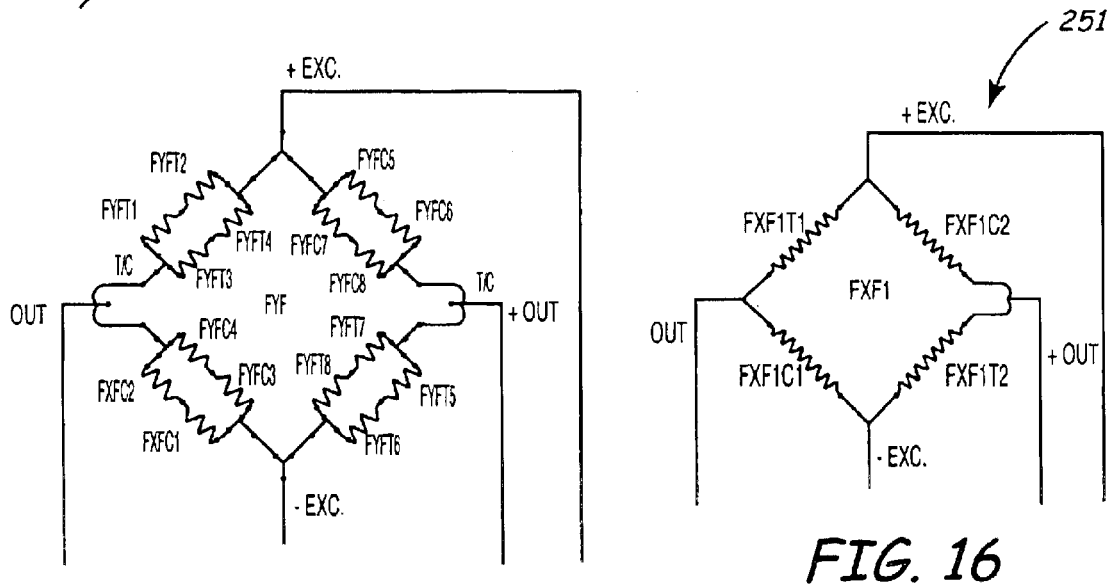
FIG. 20
FIG. 16

MULTI-AXIS LOAD CELL

CROSS-REFERENCED TO RELATED APPLICATION

The present application is based on and claims the benefit of U.S. provisional patent application Ser. No. 60/255,947, filed Dec. 15, 2000, the content of which is hereby incorporated by reference in its entirety.

BACKGROUND OF THE INVENTION

The present invention relates to a load cell that transmits and measures linear forces along and moments about up to three orthogonal axes. More particularly, a compact load cell body is disclosed for minimizing heat affects on sensors present on the load cell body.

Transducers or load cells for determining forces along and moments about three orthogonal axes are known. Two such load cells are disclosed in U.S. Pat. Nos. 4,640,138 and 4,821,582. U.S. Pat. No. 4,640,138 illustrates a multiple axis load-sensitive transducer having inner and outer members that are joined by a pair of axially spaced spiders. The spiders comprise arms that are integral with the inner member and are connected to the outer member by flexible straps that have longitudinal links with the ends of the straps fixed to the outer member. The arms of the spiders are fixed to the center of the associated strap. Loads are sensed as a function of bending on the spider arms.

U.S. Pat. No. 4,821,582 illustrates a load transducer that measures linear forces in three axes and moments about two of the axes. The transducer has inner and outer structures connected by load sensitive spider arms or shear beams. The outer ends of the spiders are connected to outer links which are stiff when the inner structure is loaded in a direction along an axis perpendicular to the plane of the spider.

Each of the foregoing load cells can be affected adversely be heat. For instance, the load cell of U.S. Pat. No. 4,821,582 includes bearings allowing a shaft to rotate therein. The bearings are supported by the spiders, and thus, are relatively close to the sensing elements disposed thereon. However, the bearings are a source of heat due to rotation of the shaft. The load cell body, being constructed of thermally conductive material, can transfer heat to the sensing devices, which can affect the accuracy and/or life span of the load cell.

There is an ongoing need to provide an improved compact load cell that can measure components of forces and moments in plural directions and yet be easy to manufacture. Preferably, a load cell body of the load cell should also minimize heat conducted to the sensing devices.

SUMMARY OF THE INVENTION

A load cell includes first and second sensor supports assemblies. Each sensor support assembly has a rigid central hub having an end plate and a support element extending transversely from the end plate and a rigid annular ring concentric with the central hub. The load cell further includes a first mount joined to the end plate of the first sensor support assembly, the mount being spaced apart from and extending in the same direction as the support element of the first sensor support assembly. In addition, a first plurality of sensing devices are operably coupled between the support element of the first sensing support assembly and the corresponding annular ring. A second plurality of sensing devices are operably coupled between the support element of the second sensor support assembly and the corresponding annular ring. Furthermore, the end plates of the first and second sensor support assemblies are joined together.

Another aspect of the present invention is a load cell body having first and second sensor support assemblies. Each support assembly includes an integral assembly having a rigid central hub having an end plate and a support element extending transversely from the end plate. Furthermore, each sensor support assembly includes a rigid annular ring concentric with the central hub and at least three load sensing radial tubes extending readily from the central hub to the annular ring. In addition, the ends plates of the first and second sensor support assemblies are joined together.

BRIEF DESCRIPTION OF THE DRAWINGS

FIG. 8 is a front elevational view of a front sensor support assembly.

FIG. 9 is a side elevational view of the front sensor support assembly.

FIGS. 12–15 are each pictorial representations of strain gauges mounted to various sensing tubes.

FIGS. 16–19 are individual Wheatstone bridge circuits formed from the strain gauges of FIGS. 12–15.

FIG. 20 is a Wheatstone bridge circuit formed from the strain gauges of FIGS. 12–15.

DETAILED DESCRIPTION OF THE ILLUSTRATIVE EMBODIMENT

Figure 1:
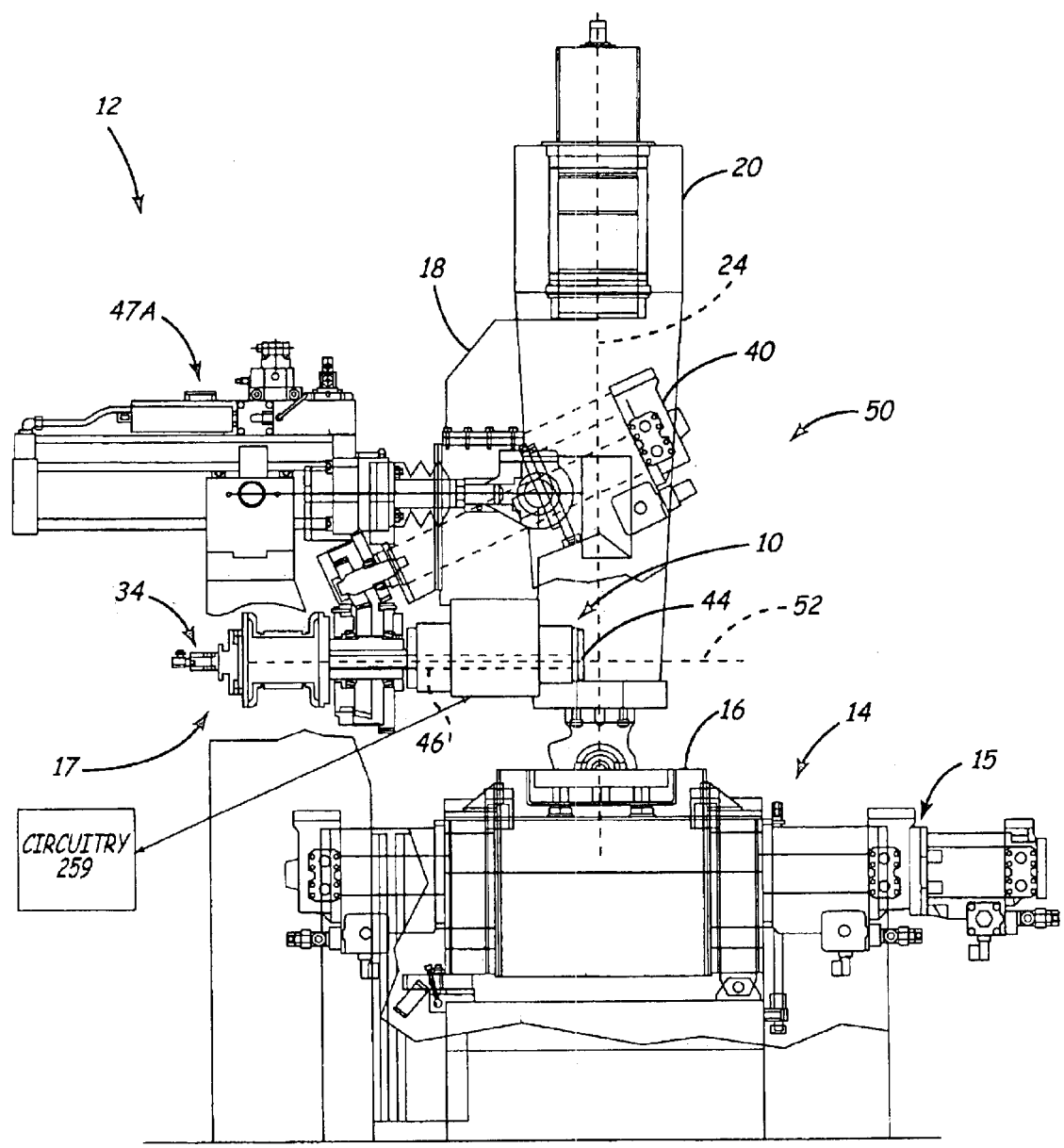
FIG. 1 is a side view of a testing machine having a load cell of the present invention.
Figure 2:
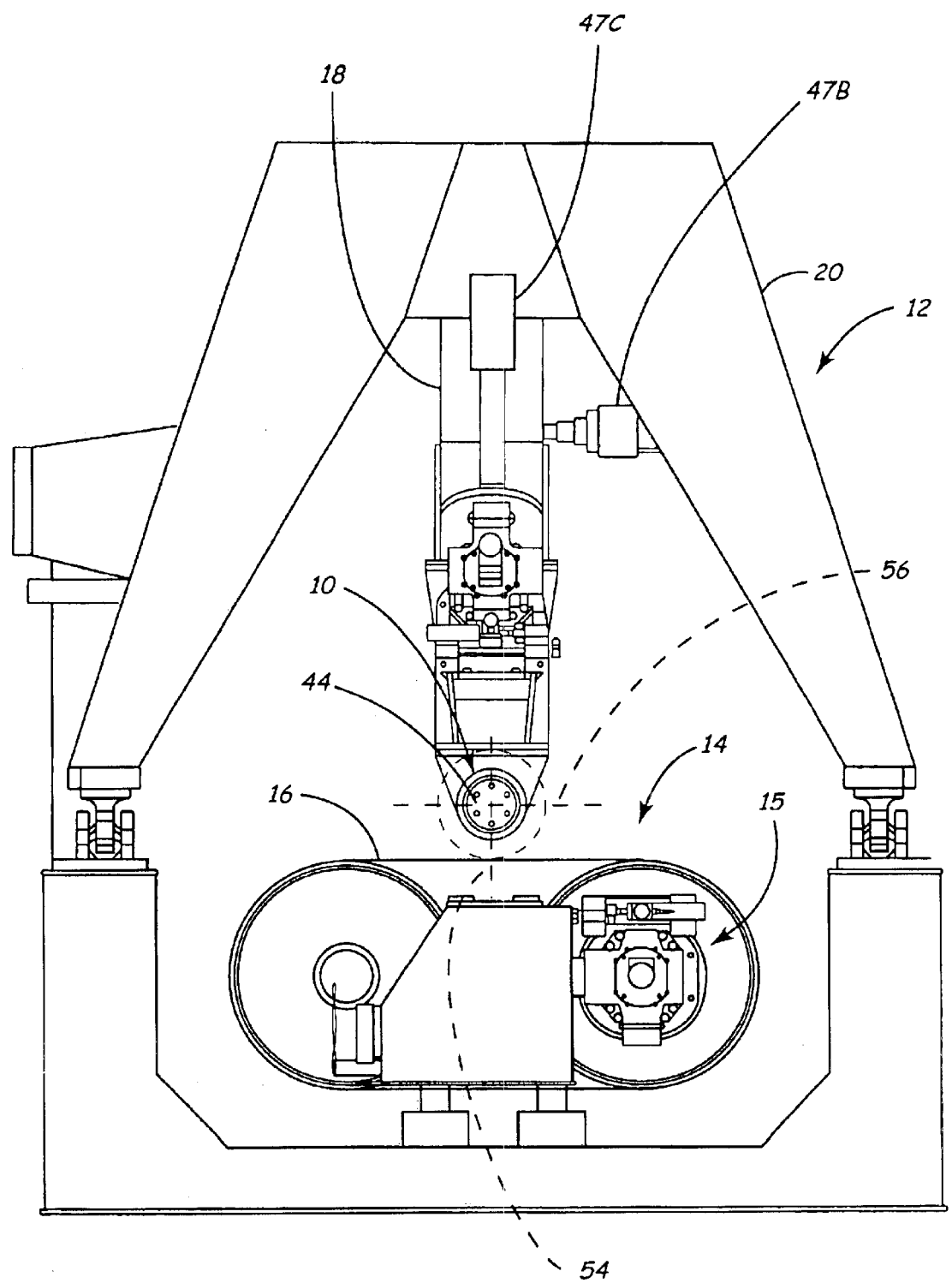
FIG. 2 is a front view of the testing machine.
Figure 3:
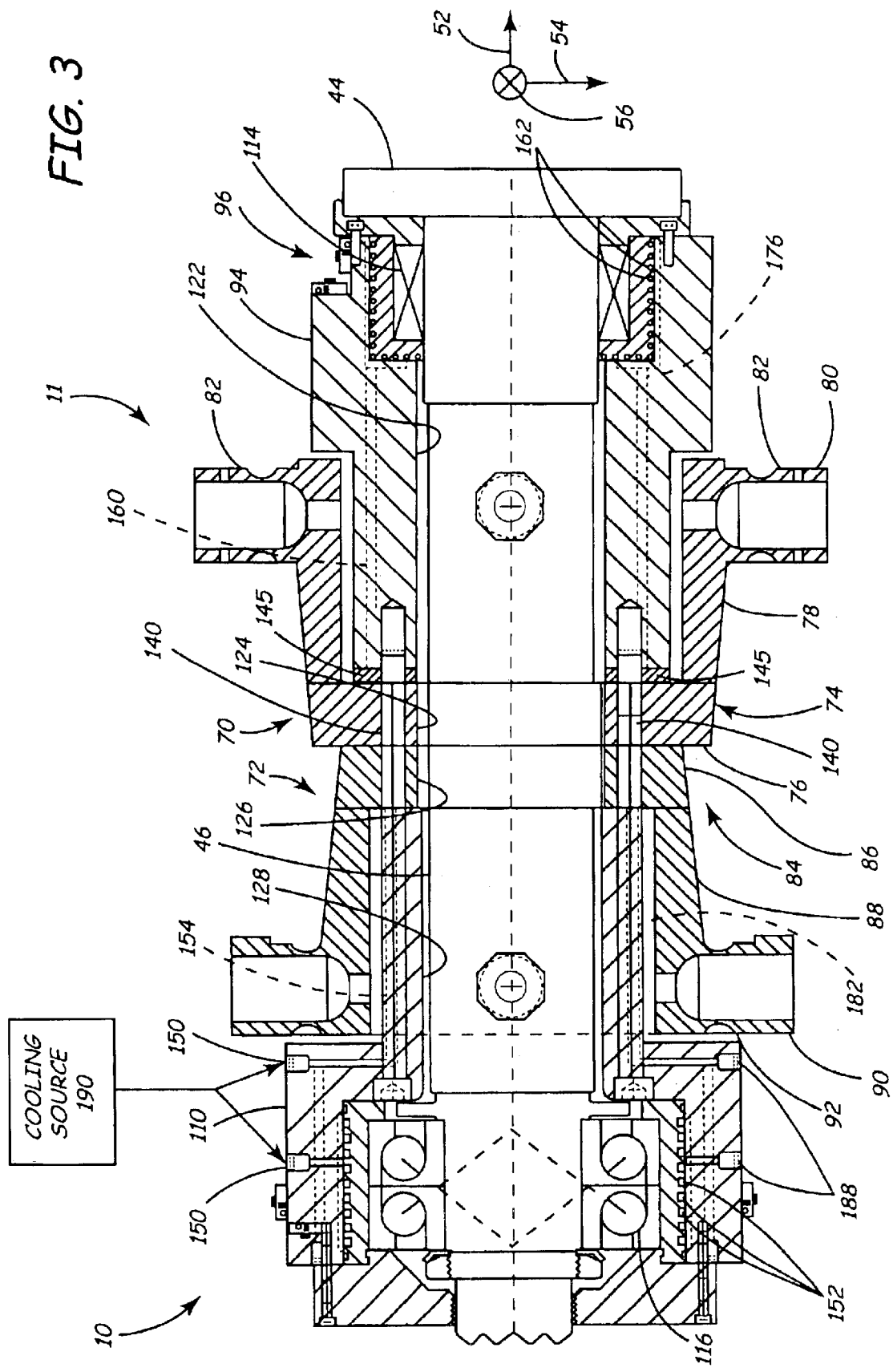
FIG. 3 is a sectional view of the load cell with a housing removed.
Figure 4:
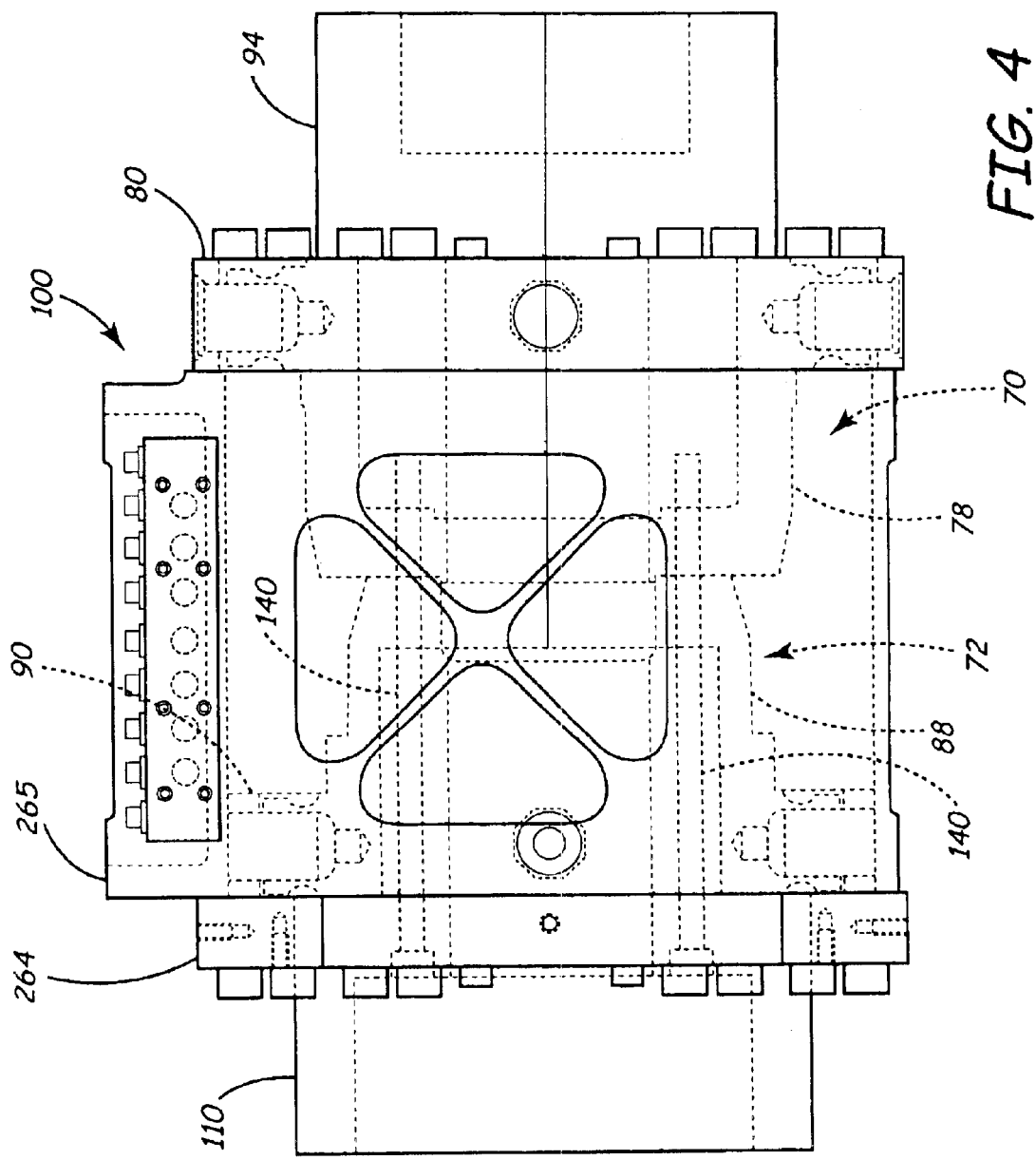
FIG. 4 is a side elevational view of the load cell.
Figure 5:
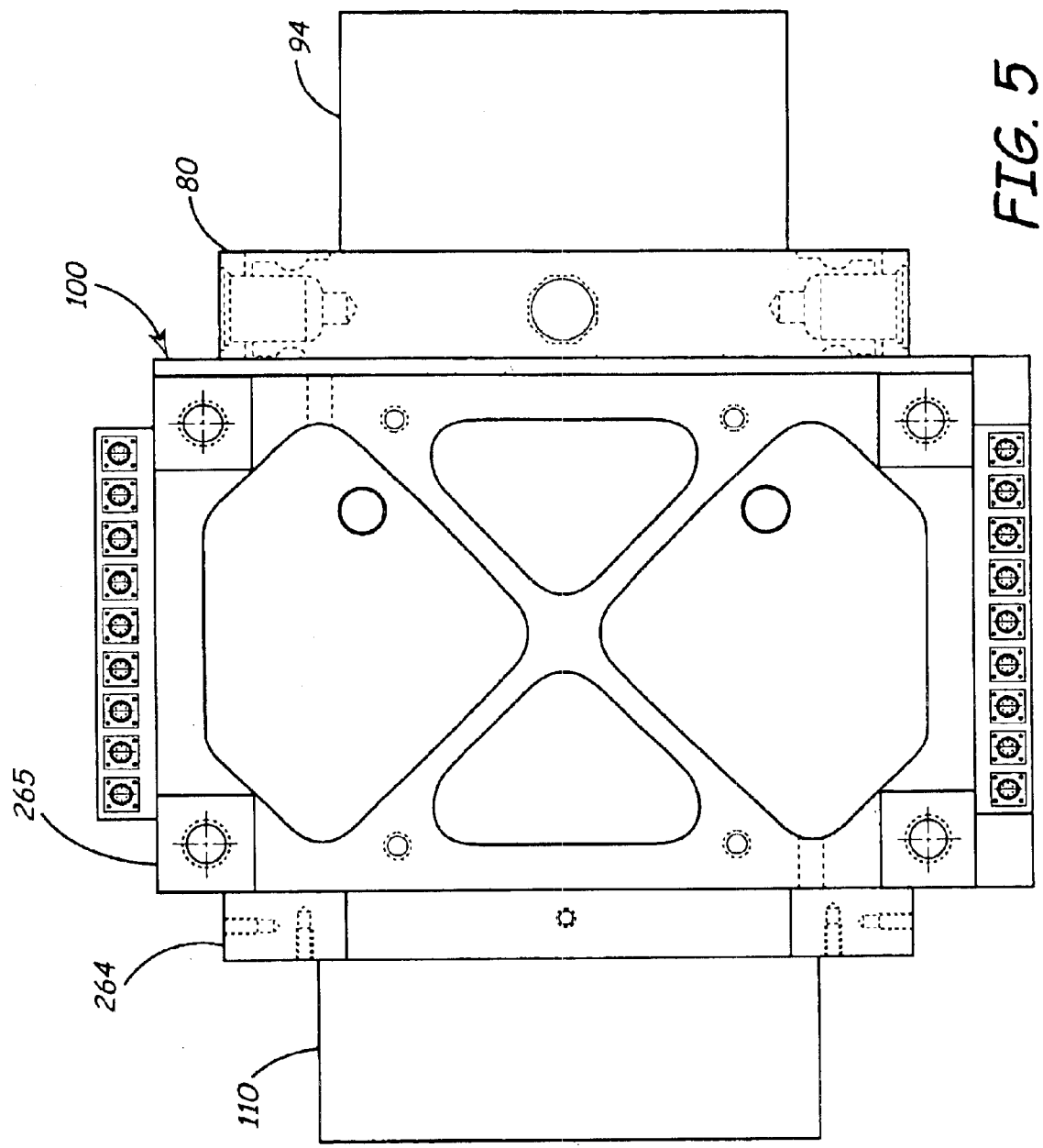
FIG. 5 is a top plan view of the load cell.
Figure 6:
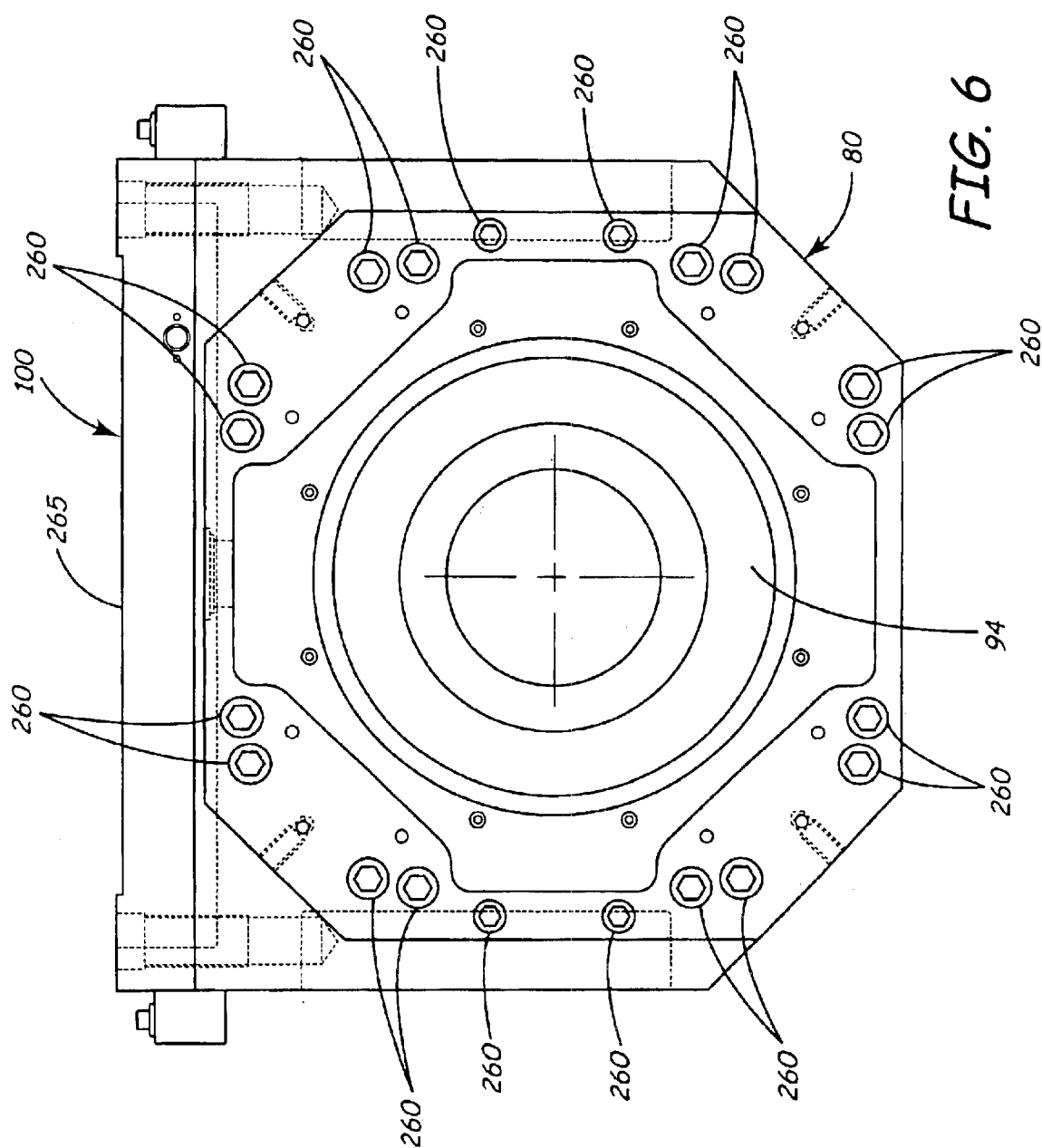
FIG. 6 is a front elevational view of the load cell.
Figure 7:
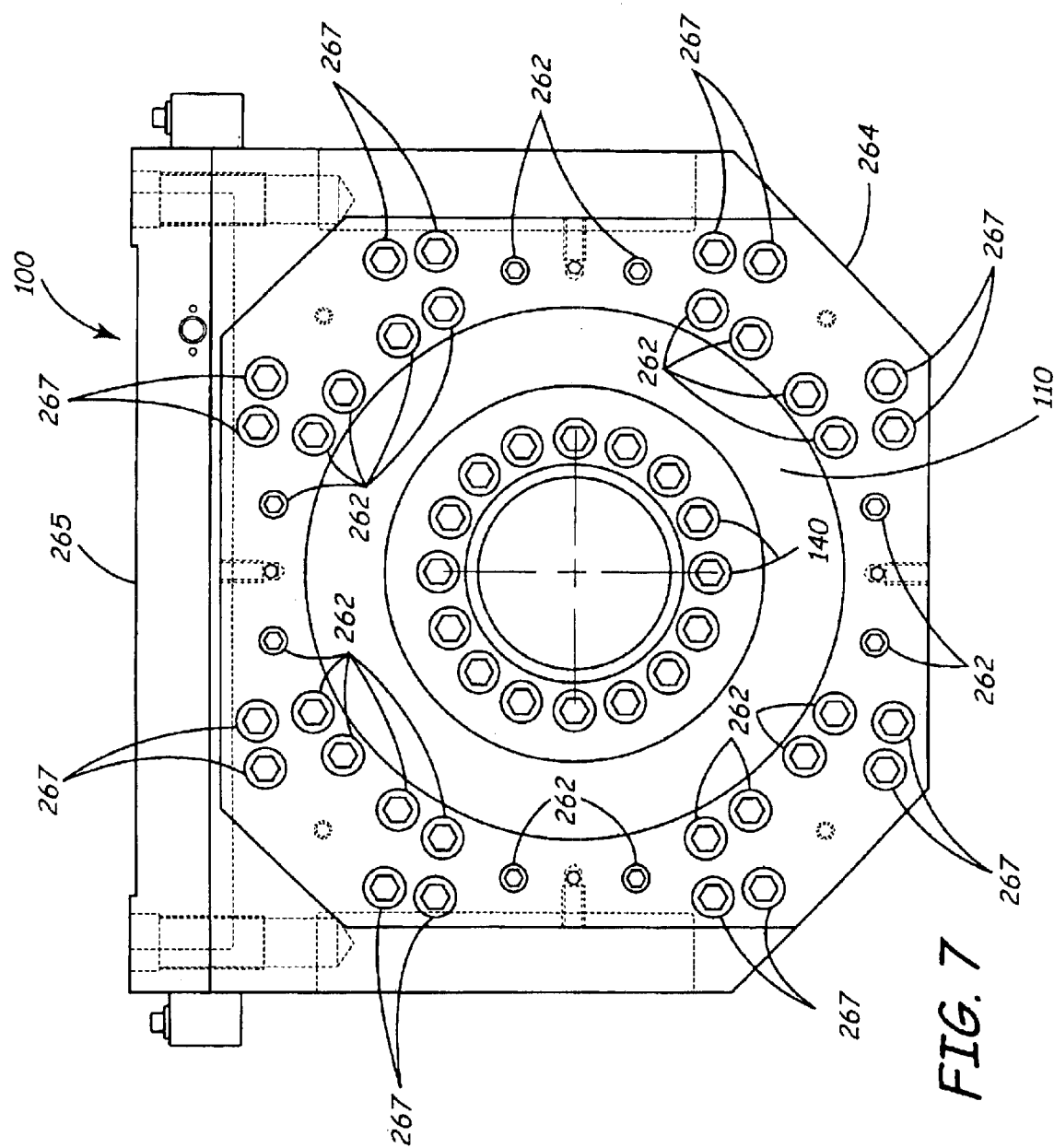
FIG. 7 is a rear elevational view of the load cell.
Figure 11:
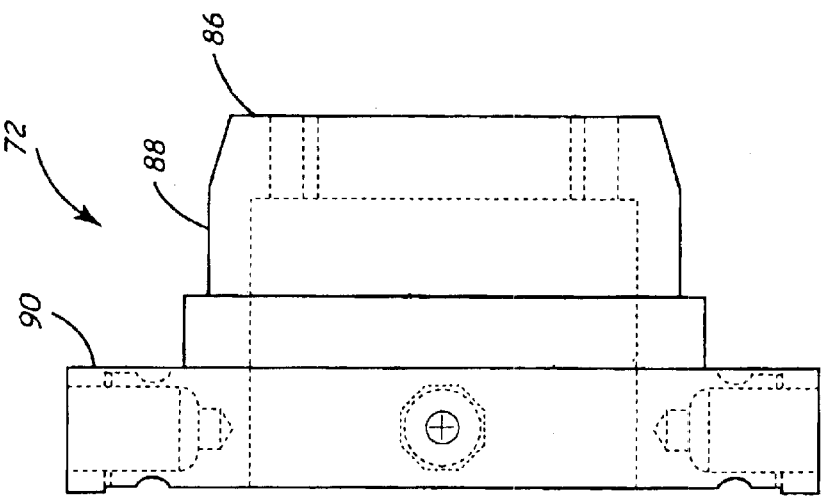
FIG. 11 is a side elevational view of the rear sensor support assembly.

A load cell 10 of the present invention is illustrated mounted onto a tire and wheel testing machine 12 in FIGS. 1 and 2. The tire and wheel testing machine 12 generally includes a road surface simulator 14 comprising an endless belt 16 that forms a revolving surface and a drive motor 15. A spindle drive assembly 17 includes a support member 18 moveably joined to a frame 20 to pivot about a steer axis 24. The spindle drive assembly 17 can drive a tire and/or wheel under test, if desired. A coupling assembly 34 couples a drive motor 40 to a spindle shaft 46, that in turn, is coupled to a spindle hub 44, which supports the wheel. The spindle shaft 46 extends through the load cell 10 and is coupled to the spindle hub 44. The load cell 10 measures forces and/or moments imparted to or through the wheel assembly. Various actuators 47A, 47B, 47C, control camber, steer and radial loads and position, respectively. The testing machine 12 is illustrated as one exemplary embodiment for the load cell 10.

Before describing further aspects of the load cell 10, for purposes of explanation, forces and moments are measured with respect to stationary orthogonal coordinate system 50. A Y-axis 52 extends through the load cell 10 and spindle hub 44 (wherein an axis of rotation of the tire and wheel assembly, shaft 46, can be oriented substantially parallel to or on the Y-axis 52). A Z-axis 54 is perpendicular to the Y-axis 52 and is substantially perpendicular to a simulated road surface of the road simulator 14. An X-axis 56 is mutually perpendicular to the Y-axis 52 and the Z-axis 54.

Referring to FIGS. 3–7, the load cell 10 includes a body 11 having a first sensor support assembly 70 and a second sensor support assembly 72 joined together. In the embodiment illustrated, the first sensor support assembly 70 and the second sensor support assembly 72 are similar. Referring to sensor support assembly 70 by way of example, the assembly includes a rigid central hub 74 having an end plate 76 and a support element 78 extending transversely or obliquely from the end plate 76. A rigid annular ring 80 is coaxial or concentric with the central hub 74. A first plurality of sensing devices 82 are operably coupled between the support element 78 of the first sensor support assembly 70 and the corresponding annular ring 80. The second sensor support assembly 72 is similarly constructed having a central hub 84, an end plate 86 and a support element 88, wherein a second plurality of sensing devices 92 are operably coupled between the support element 88 and a rigid annular ring 90.

A mount 94 is joined to the end plate 76 of the first sensor support assembly 70. The mount 94 is spaced apart from and extends in the same direction as the support element 78 of the first sensor support assembly 70. In general, the load cell 10 measures forces and moments with respect to the orthogonal coordinate system 50 reacted through the load cell body 11 between the rigid annular rings 80 and 90 and the mount 94. The load cell body 11 is particularly advantageous because heat present in the mount 94, and particularly on an end 96 thereof, must conduct along the length of the mount 94 through the end plates 76 and 86 and along the length of the support elements 78 and 88 in order to reach the sensing devices 82 and 92. In this manner, the sensing devices 82 and 92 are effectively remote from any heat present on the end 96 of the mount 94, which thereby reduces thermal or temperature affects on the sensing devices 82 and 92, thereby increasing the accuracy and the life of the load cell 10. However, since the mount 94 extends into the central hub 74, a compact load cell is achieved.

In the embodiment illustrated, a housing 100 (FIG. 4) is provided to which each of the annular rings 80 and 90 are secured. The housing 100 is in turn secured to the support member 18. As indicated above, the load cell 10 can be used on the tire and wheel testing machine 12, and accordingly, the spindle shaft 46 can extend therethrough. In order to support the spindle shaft 46, a second mount 110 is also provided. The second mount 110 is joined to the end plate 86 of the second sensor support assembly 72. The second mount 110 is spaced apart and extends in the same direction as the support element 88 of the second sensor support assembly 72. To allow rotation of the shaft 46, a first bearing assembly 114 is provided in the first mount 94, while a second bearing assembly 116 is provided in the second mount 110. Bores 122, 124, 126 and 128 are provided in the first mount 94, the end plate 76, the end plate 86 and the second mount 110, respectively, to form a common bore through which the spindle shaft 46 can extend. In the embodiment illustrated, the first bearing assembly 114 comprises needle bearings for carrying radial loads imparted to the spindle shaft 46, while the second bearing assembly 116 comprises a duplex pair of bearings for carrying thrust and radial loads. The duplex pair of bearings 116 are angular contacting bearings that are preloaded to carry the thrust loads. It should be noted that the specific type of bearings used for bearing assembly 114 and 116 are well suited for use in the tire and wheel testing machine 12; however, in other applications, different forms of bearings may be desired.

In the embodiment illustrated, the load cell 10 is easy to assembly wherein a plurality of bolts 140 join the first sensor support assembly 70, the second sensor support assembly 72, the first mount 94 and the second mount 110 together. In particular, each of the bolts 140 extends through bores provided in the second mount 110, the end plate 86 and the end plate 76 and threadably engage threaded apertures provided in the first mount 94. Pilot flanges can be provided between each of the mating components and reduced areas of contact (slight projections formed on each component about each mounting bolt) such as between end plates 76 and 86 can be provided to properly align the components and ensure proper contact. It should also be noted in an alternative embodiment, the end plates 76 and 86 can be joined integrally together wherein the first sensor support assembly 70 and the second sensor support assembly 72 are formed from a single unitary body.

As described above, heat present or generated at the end 96 of the mount 94 must be conducted along the length of the mount 94, through the end plate 76 and along the length of the support elements 78 to reach any of the sensing devices 82. If desired, insulting elements can be provided anywhere along the length of heat conduction from the mount 94 and/or the mount 110, if present. For instance, an insulating element 145 such as a ceramic washer can be provided between the interface of the end plate 76 and the mount 94. The insulating element 145 further limits heat conduction to the sensing devices 82.

Figure 10:
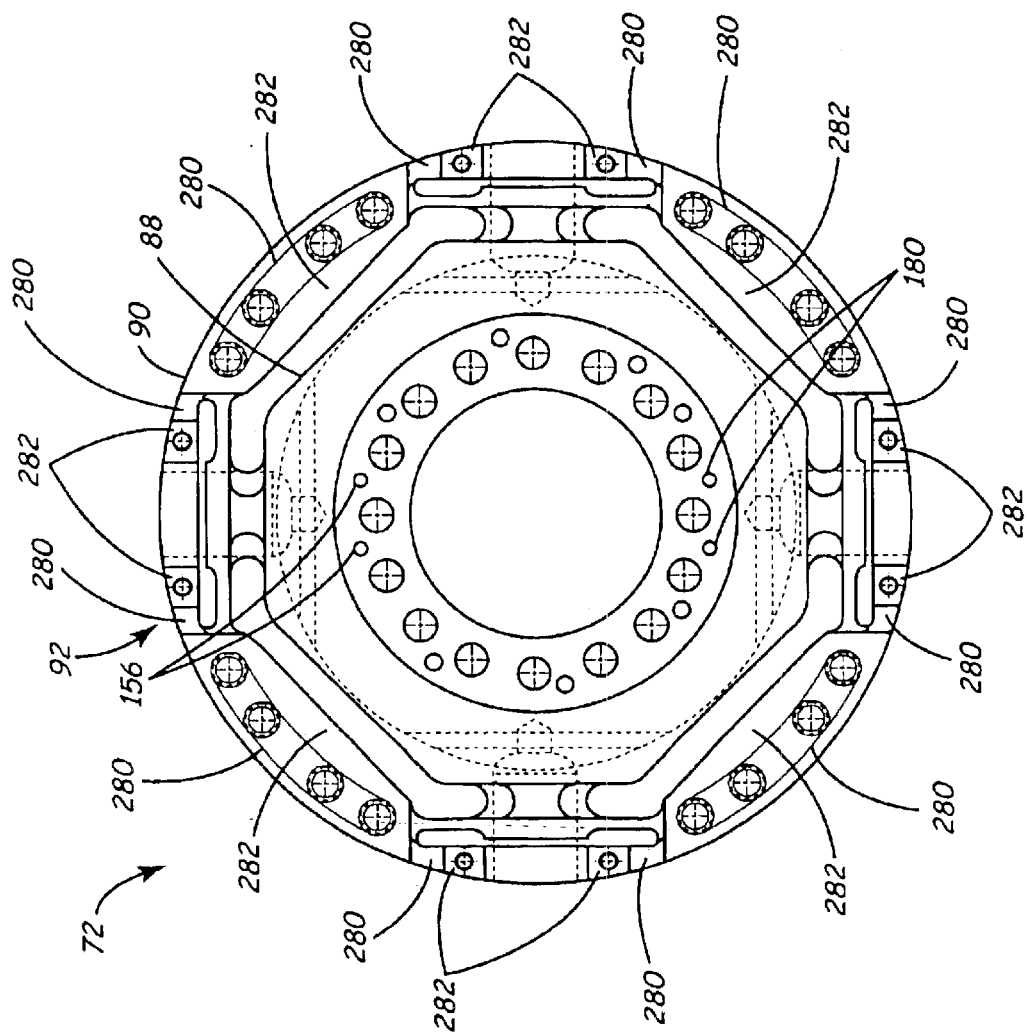
FIG. 10 is a rear elevational view of a rear sensor support assembly.
Figure 13:
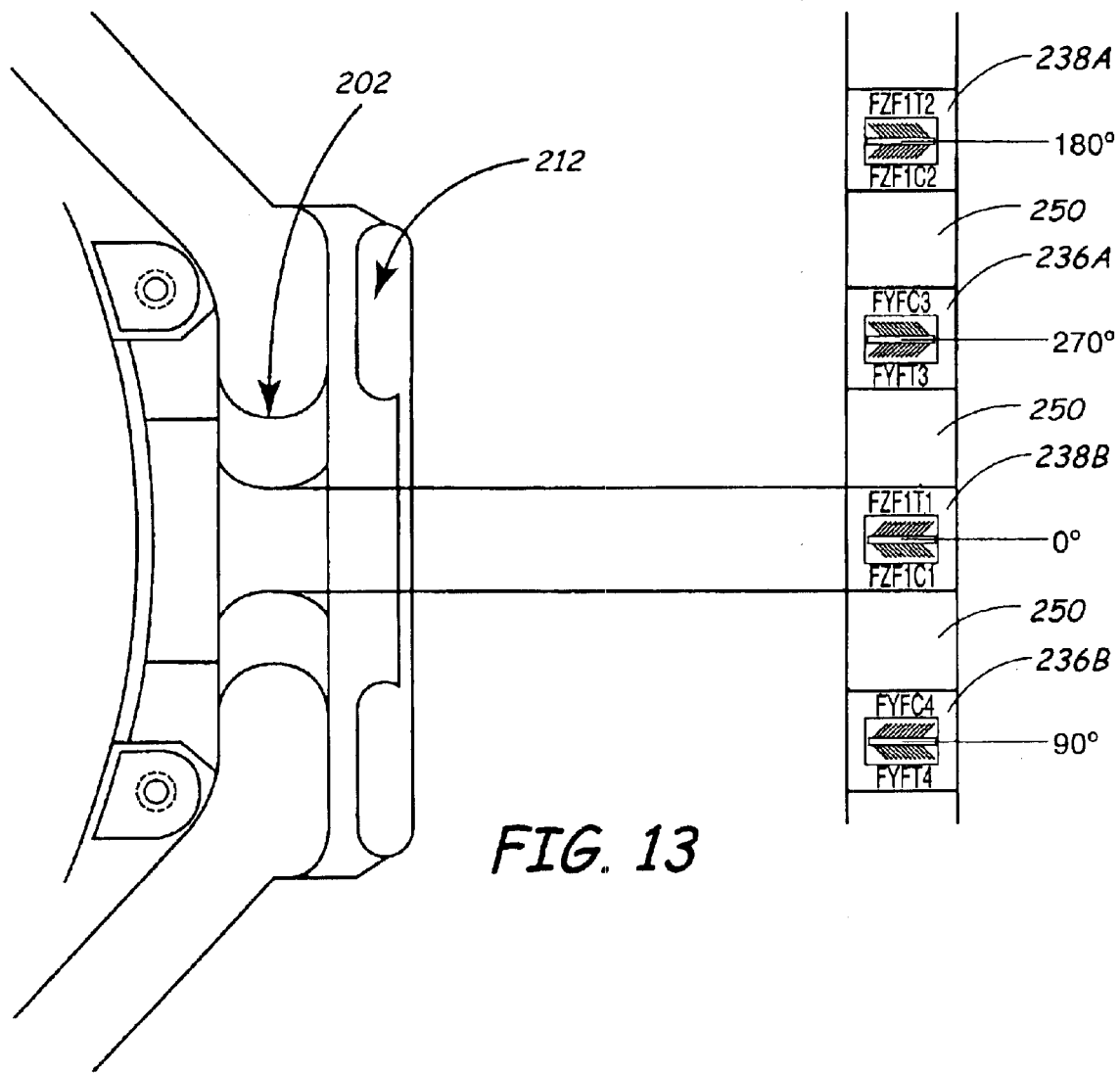

To also minimize heat that can be conducted to the sensing devices 82, in yet another embodiment, the load cell 10 can include cooling passageways or channels in place or in addition to any insulating elements. In the embodiment illustrated, cooling ports 150 are provided in the second mount 110. The ports 150 are fluidly coupled to circumferential grooves 152 formed about the bearing assembly 116. Passageways 154 also are fluidly coupled to the ports 150 and extend along the length of the second mount 110 toward the end plate 86. The passageways 154 are fluidly coupled to passageways 156 (FIG. 10) formed in the end plate 86 and, in turn, fluidly coupled to passageways 158 (FIG. 8) formed in the end plate 76. Passageways 160 in the first mount 94 are fluidly coupled to passageways 158 of the end plate 76. In the embodiment illustrated, the passageways 160 extend toward the end 96 of the first mount 94 and are fluidly coupled to circumferential grooves 162 formed about the bearing assembly 114. Further passageways 176, 178, 180 and 182 are provided in the first mount 94, the end plate 76, the end plate 86 and the second mount 110, respectively, that are fluidly coupled to the circumferential grooves 152 and 162 of bearing assembly 116 and 114, respectively, and ports 188 to allow cooling fluid to flow. Suitable seals such as o-rings, are provided between each of the mating surfaces of the first sensor support assembly 70, the second sensor support assembly 72, the first mount 94 and the second mount 110 in order to seal the cooling passageways. The cooling fluid is provided from a cooling fluid source 190 that can include a pump, if desired.

Referring to FIGS. 8–11, in the embodiment illustrated, each of the sensing devices 82 and 92 are integral sensing structures formed between the support element 78 and 88, and the corresponding annular rings 80 and 90. For instance, each of the sensing devices 82 and 92 can comprise a plurality of radial tubes extending from the support elements 78 and 88, and to the annular rings 80 and 90. As indicated above, the sensor support assemblies 70 and 72 are similar.

Referring to the sensor support assembly 70(FIGS. 8 and 9), by way of example, the plurality of radial tubes 82 comprises four tubes 201, 202, 203 and 204. Each of the tubes 201–204 extend radially from the support element 78 toward the annular ring 80 along a corresponding longitudinal axis 201A, 202A, 203A and 204A. Preferably, axis 201A is aligned with axis 203A, while 202A is aligned with axis 204A. In addition, axes 201A and 203A are perpendicular to axes 202A and 204A. Although illustrated wherein the plurality of radial tubes 82 equals four, it should be understood that any number of tubes three or more can be used to join the central hub 74 to the annular ring 80. Preferably, the plurality of radial tubes 82 are spaced at equal angular intervals about a central axis (herein, the Y-axis 52). Flexure members 211, 212, 213 and 214 join an end of each radial tube 201–204, respectively, to the annular ring 80. The flexure members 211–214 are compliant for displacement of each corresponding radial tube 201–204 along the corresponding longitudinal axes 201A–204A. In the embodiment illustrated, the flexure members 211–214 are identical and include integrally formed flexure straps 216 and 218. The flexure straps 216 and 218 are located on opposite sides of each longitudinal axis 201A–204A and join the corresponding radial tube 201–204 to the annular ring 80. Although illustrated wherein the flexure members 211–214 are used to join the radial tubes 201–204 to the annular ring 80, it should be understood that the flexure members 211–214 could be used to join the radial tubes 201–204 to the support element 78 or central hub 74, in addition, or in the alternative to using flexure members joined to the annular ring 80.

A plurality of strain sensors 219 can be mounted on the plurality of tubes 82 to sense strain therein. Although the plurality of sensors 219 can be located on the plurality of radial tubes 82 to provide an indication of bending strains therein (for instance at the fillets joining the tubes 82 to the support element 78 or annular ring 80), the strain sensors can also be mounted conventionally to provide an output signal indicative of shear strains in the walls of the plurality of radial tubes 82. The plurality of sensors 219 can be connected for measurement of forces and moments and up to six degrees of freedom. Commonly, the plurality of sensors 219 comprise resistive strain gauges. However, other forms of sensing devices such as optical based sensors or capacitively based sensors can also be used.

In the embodiment illustrated, each of the radial tubes 201–204 include a plurality of spaced-apart wall portions of reduced thickness to concentrate stress therein. Referring to FIG. 9 and radial tube 202 by way of example, the radial tube 202 has an outer surface 230 that is octagonal being defined by eight distinct wall sections. The wall portions of reduced thickness are indicated at 232A, 232B, 232C and 232D. The wall portions of reduced thickness 232A–232D are formed by a cylindrical bore 234 in the radial tube 202 and a first pair of concave surfaces 236A and 236B facing in opposite directions and a second set of concave surfaces 238A and 238B also facing in opposite directions. Each of the bores 234 are aligned with an aperture 235 provided in the annular ring 80, and aperture 237 provided in each of the flexure members 211–214, and a recess 239 provided in the support element 78. Use of the concave surfaces 236A–236B, 238A–238B and the straight bore 234 can have the advantage of providing gradual stress concentration to the wall portions of reduced thickness 232A–232D. In addition, since the thickness of the walls from the wall portions of reduced thickness 232A–232D increases greatly over a small distance from the portions of reduced thickness 232A–232D, the structure is stiffer for overturning moments.

The second set of concave surfaces 238A and 238B are substantially orthogonal to the first set of concave surfaces 236A and 236B such that the concave surfaces of the first set and the second set are alternately disposed about the corresponding longitudinal axis 202A. Although illustrated wherein the thickness of the portions 232A and 232C is the same thickness as the portions 232B and 232D, the thickness can be the same or different to provide desired sensitivity and selected directions. Preferably, the thickness of portion 232A should be approximately equal to portion 232C, and the thickness of portion 232B should be approximately equal to portion 232D. Each of the strain sensors 219 are disposed in the center of each concave surface approximate to the area of reduced thickness.

The concave surfaces 236A–236B and 238A–238B can be defined by one or more centers of foci, wherein the definition of "concave" is not limited to a portion of an inner surface of a hollow sphere, but includes all outwardly opening curved surfaces, for example, cylindrical, parabolic, elliptical, etc. However, in the embodiment illustrated, each of the concave surfaces 236A–236B and 238A–238B is defined by a fixed radius, which provides easy machining of the sensor support assembly 70.

It should also be noted that concave surfaces 236A–236B and 238A–238B can have the same fixed radius or different radii. In the embodiment illustrated, each of the intervening wall sections 250 between the concave surfaces 236A–236B and 238A–238B are also concave, preferably defined by a fixed radius. This design simplifies machining, but if desired, intervening wall sections 250 can have other configurations.

At this point, it should also be noted that the portions of wall thickness 232A–232D can also be formed by planer surfaces in place of the concave surfaces 236A–236B and 238A–238B. The plurality of sensors 219 can be mounted to such planer surfaces.

It should be understood that the second sensor support assembly 72 and the plurality of radial tubes formed thereon are similarly constructed to the tubes 201–204 described above.

Figure 17:
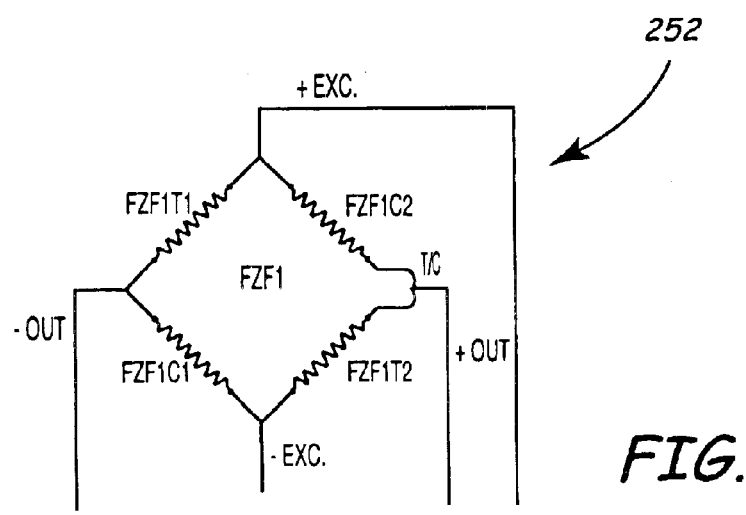
Figure 14:
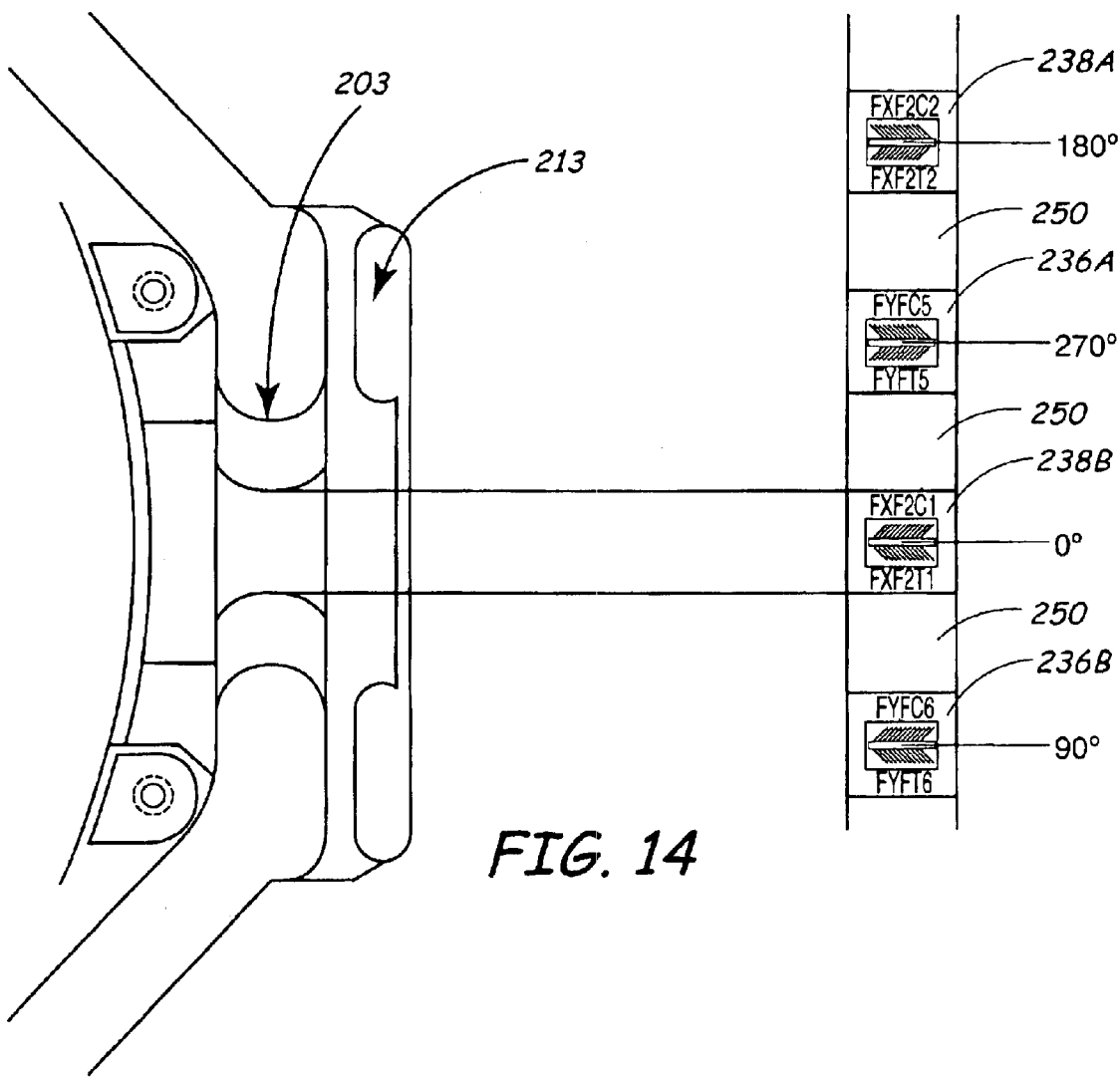
Figure 18:
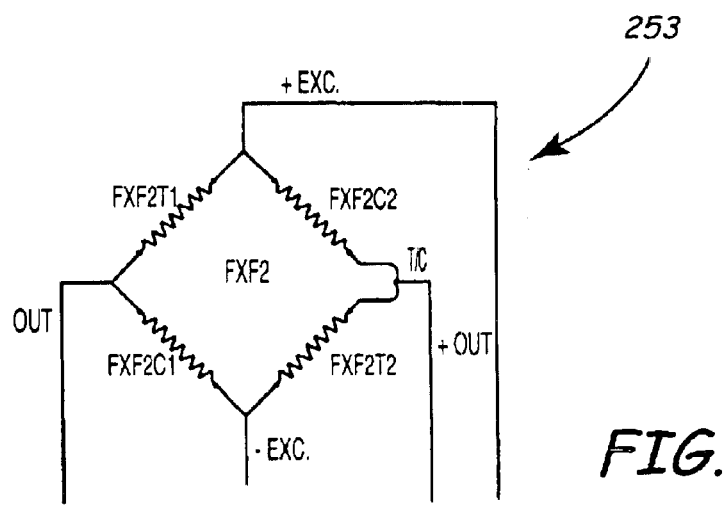
Figure 15:
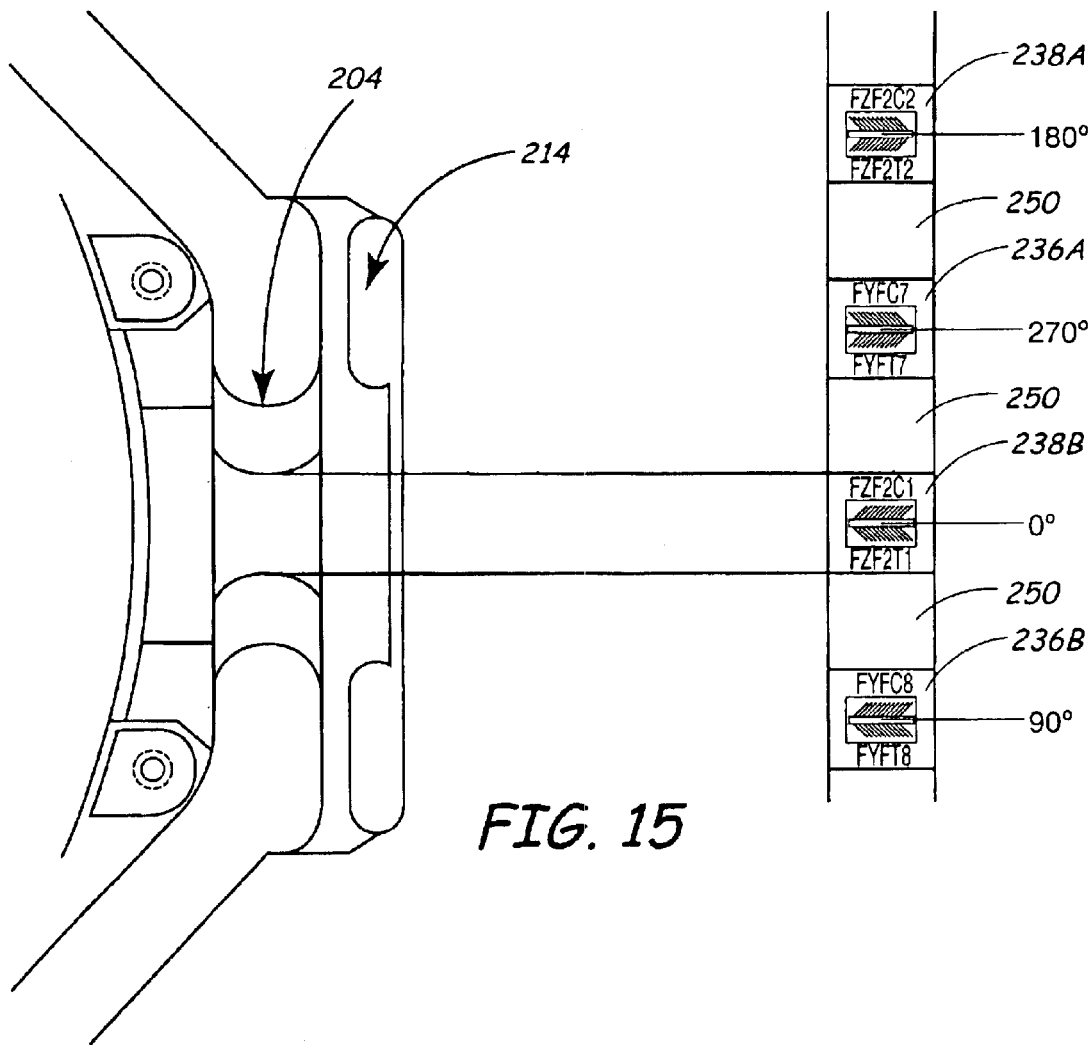
Figure 19:
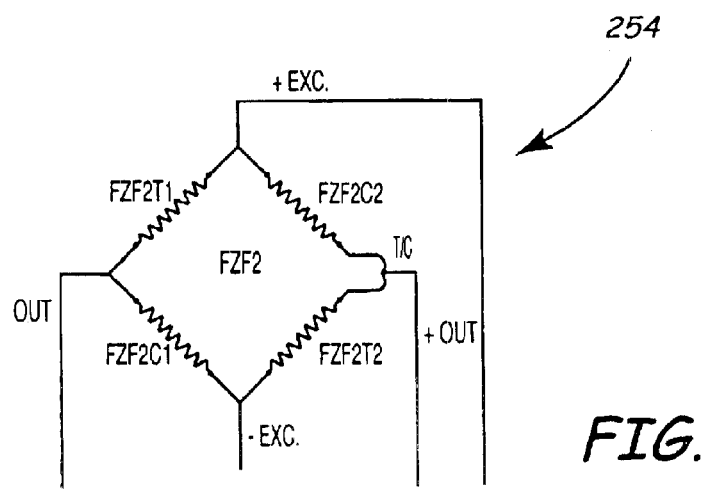

Various sensing circuits can be used to measure forces and moments with respect to the coordinate system 50. Again, using sensor support assembly 70 by way of example in that sensor support assembly 72 is similarly constructed, FIGS. 12, 13, 14 and 15 illustrate orientation of the strain gauges on the surfaces 236A–236B, 238A–238B of the tubes 201–204 in one exemplary embodiment of a sensing circuit. FIGS. 16, 17, 18 and 19 illustrate Wheatstone bridge circuits formed only from strain gauges of each tube. Specifically, FIG. 16 illustrates a Wheatstone bridge circuit 251 formed from strain gauges of tube 201. FIG. 17 illustrates a Wheatstone bridge circuit 252 formed from strain gauges of tube 202. FIG. 18 illustrates a Wheatstone bridge circuit 253 formed from strain gauges of tube 203. FIG. 19 illustrates a Wheatstone bridge circuit 254 formed from strain gauges of tube 204. FIG. 20 illustrates a further Wheatstone bridge circuit formed from strain gauges of tubes 201–204. As stated above, similar Wheatstone bridges are formed from strain gauges of assembly 72.

The forces and moments seen by the load cell 10 with respect to the coordinate system 50 can be obtained from the Wheatstone bridge circuits described above on the assemblies 70 and 72. A force along the X-axis 56 can be calculated from signals from the Wheatstone bridge circuits of FIGS. 16 and 18 and similar Wheatstone bridge circuits of assembly 72. A force along the Z-axis 54 can be calculated from signals from the Wheatstone bridge circuits of FIGS. 17 and 19 and similar Wheatstone bridge circuits of assembly 72. A force along the Y-axis 52 can be calculated from signals from the Wheatstone bridge circuits of FIG. 20 and the similar Wheatstone bridge circuit of assembly 72. A moment about the X-axis 56 can be calculated as a function of the forces sensed by Wheatstone bridge circuits 17 and 19, as one force component, and similar Wheatstone bridge circuits of assembly 72 as the other force component. Likewise, a moment about the Z-axis 54 can be calculated as a function of the forces sensed by Wheatstone bridge circuits 16 and 18, as one force component, and similar Wheatstone bridge circuits of assembly 72 as the other force component. In view that bearing assemblies 114 and 116 allow rotation of the shaft 46, there is no substantial moment about the Y-axis 52. However, as appreciated by those skilled in the art, a moment about the Y-axis 52 can be calculated from the Wheatstone bridge circuits of FIGS. 16–19 and similar Wheatstone bridge circuits of assembly 72, if desired in other applications of the load cell 10. A circuit 259 (FIG. 1) comprising analog and/or digital components receives the signals from each of the Wheatstone bridge circuits to calculate the desired forces and moments.

The load cell body 11 can be made from 2024 T3 aluminum, titanium, 4340 steel, 17-4 PH stainless steel or other high-strength materials.

It should also be noted that the radial tubes, other forms of sensing devices 82, 92 can be used in place of the integral radial tubes shown herein. For instance, other forms of integral sensing structures such as solid beams can be used. In addition, piezoelectric sensors, optically based sensors, capacitively based sensors, which are not integrally formed with the sensor support structures 70 and 72 but instead are joined thereto, can also be disposed between the support element 78 and 88 and the corresponding annular rings 80 and 90 and still benefit from the present invention, because, as stated above, heat present on the ends of the mounts 94 and 110 must travel along the length of the mounts 94 and 110 and the corresponding support elements 78 and 88 to reach the sensing devices 82, 92.

As indicated above, fasteners 140 join the end plate 76, the end plate 86, the mount 94, and if present, the mount 110 together. Fasteners 260 secure the annular ring 80 to the housing 100. Fasteners 262 secure the annular ring 90 to an end plate 264 of housing 100. The end plate 264 is joined to a central body 265 of housing 100 with fasteners 267.

In the embodiment illustrated, a diameter of the annular ring 90 is less than a diameter of the ring 80 so as to allow the sensor support assembly 70 and 72 to be inserted into the housing 100. As known to those skilled in the art, mounting apertures in the annular rings 80 and 90 can be counterbored, and reliefs (e.g. 280 in FIG. 10) can be provided on the mounting surfaces so as to form projections (e.g. 282 in FIG. 10) about each of the mounting apertures for the fasteners described above to increase and make more uniform contact stresses between the coupled elements.

Although the present invention has been described with reference to preferred embodiments, workers skilled in the art will recognize that changes may be made in form and detail without departing from the spirit and scope of the invention.

What is claimed is:

1. A load cell comprising:
   a first sensor support assembly and a second sensor support assembly, each sensor support assembly comprising an assembly having:
      a rigid central hub having an end plate and a support element extending transversely or obliquely from the end plate; and
      a rigid annular ring concentric with the central hub;
      a mount joined to the end plate of the first sensor support assembly, the mount being spaced apart from and extending in the same direction as the support element of the first sensor support assembly;
      a first plurality of sensing devices operably coupled between the support element of the first sensor support assembly and the corresponding annular ring;
      a second plurality of sensing devices operably coupled between the support element of the second sensor support assembly and the corresponding annular ring; and
      wherein the end plates of the first and second sensor support assemblies are joined together.

2. The load cell of claim 1 wherein the central hub, annular ring and sensing devices of each sensor support assembly are integral.

3. The load cell of claim 2 wherein each sensing device comprises an integral radial tube with sensors operably coupled thereto.

4. The load cell of claim 3 wherein each sensor support assembly includes an integral flexure member extending between an end of each radial tube to at least one of the annular ring and central hub, the flexure member being compliant for displacements of each corresponding radial tube along the corresponding longitudinal axis.

5. The load cell of claim 2 wherein each sensor support assembly includes a flexure member for each sensing device, the flexure member being formed integral with at least one of the annular ring and central hub, the flexure member being compliant for displacements of each sensing device along the corresponding longitudinal axis.

6. The load cell of claim 1 wherein the end plates of the first and second sensor support assemblies are integral.

7. The load cell of claim 1 and further comprising:
   a second mount joined to the end plate of the second sensor support assembly, the second mount being spaced apart from and extending in the same direction as the support element of the second sensor support assembly.

8. The load cell of claim 7 wherein each end plate, the first-mentioned mount and the second mount include a bore, the bores being aligned to form a common bore through the load cell.

9. The load cell of claim 8 and further comprising:
   a first bearing mounted in the first mount;
   a second bearing mounted in the second mount;
   a shaft supported by the first and second bearings extending through the common bore.

10. The load cell of claim 7 and further comprising:
    a first passageway in the first mount fluidly coupled to a fluid source and adapted to receive a cooling fluid;
    a second passageway in the second mount fluidly coupled to the fluid source and adapted to receive the cooling fluid.

11. The load cell of claim 1 and further comprising an insulating element disposed between the first mount and the end plate of the first sensor support assembly.

12. A load cell body comprising:
    a first sensor support assembly and a second sensor support assembly, each sensor support assembly comprising an assembly having:
       a rigid central hub having an end plate and a support element extending transversely or obliquely from the end plate; and
       a rigid annular ring concentric with the central hub;

a mount joined to the end plate of the first sensor support assembly, the mount being spaced apart from and extending in the same direction as the support element of the first sensor support assembly;

a first plurality of sensing structures joined to the support element of the first sensor support assembly and the corresponding annular ring;

a second plurality of sensing structures joined to the support element of the second sensor support assembly and the corresponding annular ring; and wherein the end plates of the first and second sensor support assemblies are joined together.

13. The load cell body of claim 12 wherein the central hub, annular ring and sensing structures of each sensor support assembly are integral.

14. The load cell body of claim 13 wherein each sensor support assembly includes a flexure member for each sensing structure, the flexure member being formed integral with at least one of the annular ring and central hub, the flexure member being compliant for displacements of each sensing structure along the corresponding longitudinal axis.

15. The load cell body of claim 13 wherein each sensing structure comprises an integral radial tube with sensors operably coupled thereto.

16. The load cell body of claim 15 wherein each sensor support assembly includes an integral flexure member extending between an end of each radial tube to at least one of the annular ring and central hub, the flexure member being compliant for displacements of each corresponding radial tube along the corresponding longitudinal axis.

17. The load cell body of claim 12 wherein the end plates of the first and second sensor support assemblies are integral.

18. The load cell body of claim 12 and further comprising:

a second mount joined to the end plate of the second sensor support assembly, the second mount being spaced apart from and extending in the same direction as the support element of the second sensor support assembly.

19. The load cell body of claim 18 wherein each end plate, the first-mentioned mount and the second mount include a bore, the bores being aligned to form a common bore through the load cell.

20. The load cell body of claim 19 and further comprising:

a first bearing mounted in the first mount;

a second bearing mounted in the second mount;

a shaft supported by the first and second bearings extending through the common bore.

21. The load cell body of claim 18 and further comprising:

a first passageway in the first mount fluidly coupled to a fluid source and adapted to receive a cooling fluid;

a second passageway in the second mount fluidly coupled to the fluid source and adapted to receive the cooling fluid.

22. The load cell body of claim 12 and further comprising an insulating element disposed between the first mount and the end plate of the first sensor support assembly.

* * * * *